United States Patent [19]
Poli et al.

[11] Patent Number: 5,984,485
[45] Date of Patent: Nov. 16, 1999

[54] UNIFORM ILLUMINATION DEVICE FOR THE DIAL OF A DISPLAY DEVICE

[75] Inventors: Jean-Charles Poli, Les Geneveys-sur-Coffrane; Joachim Grupp, Neuchâtel; Juan Manuel Teijido, Auvernier; Hans Peter Herzig, Neuchâtel, all of Switzerland

[73] Assignee: Asulab S.A., Bienne, Switzerland

[21] Appl. No.: 09/016,273

[22] Filed: Jan. 30, 1998

[30] Foreign Application Priority Data

Feb. 19, 1997 [CH] Switzerland .......................... 0385/97

[51] Int. Cl.$^6$ ................................ G04B 19/30; F21V 8/00
[52] U.S. Cl. .................... 362/26; 368/67; 362/30; 362/31
[58] Field of Search ................... 368/67; 362/31, 362/30, 26, 27, 571, 558

[56] References Cited

U.S. PATENT DOCUMENTS

| | | | |
|---|---|---|---|
| 4,217,625 | 8/1980 | Klein | 362/30 |
| 4,561,042 | 12/1985 | Wehner et al. | 362/30 |
| 4,705,407 | 11/1987 | Brien | 368/227 |
| 4,908,739 | 3/1990 | Brien | 362/23 |
| 5,363,294 | 11/1994 | Yamamoto et al. | 362/26 X |
| 5,575,549 | 11/1996 | Ishikawa et al. | 362/31 |
| 5,604,716 | 2/1997 | Cheung | 368/67 |

FOREIGN PATENT DOCUMENTS

| | | |
|---|---|---|
| 889069 | 4/1941 | France . |
| 1285829 | 1/1962 | France . |
| 2052114 | 1/1981 | United Kingdom . |

OTHER PUBLICATIONS

Patent Abstracts Of Japan, vol. 96, No. 1, Jan. 31, 1996 & JP 07 24 8385 (Citizen Watch Co., Ltd.) Sep. 26, 1995.

Patent Abstracts Of Japan, vol. 8, No. 117 (P–277), May 31, 1984 & JP 59 024284 A (Orient Tokei KK) Feb. 7, 1984.

Patent Abstracts Of Japan, vol. 16, No. 12 (P–1297), Jan. 13, 1992 & JP 03 231118 A (Nippondenso Co. Ltd.), Oct. 15, 1991.

*Primary Examiner*—Laura K. Tso
*Attorney, Agent, or Firm*—Sughrue, Mion, Zinn, Macpeak & Seas, PLLC

[57] ABSTRACT

Illumination device for the dial (4) of a display device formed by a case (1) sealed by a crystal (8) arranged above the dial (4) and held by a fitting ring (9), said device including at least one light source (13, 33, 35, 43, 53) arranged in at least one recess arranged in at least one light guide (20, 30, 40, 50) positioned at the periphery of the dial (4), said guide having a polished internal surface (21) oriented towards the dial (4) and an external surface (22) held in a space delimited by the dial (4), the crystal (8) and the inner wall (10) of the fitting ring (9), characterised in that all or part of said external surface (22) of the guide is arranged to allow a progressive increase along the guide (20, 30, 40, 50) of the quantity of light diffused by said external wall gradually as one moves away from one of the light sources (13, 33, 35, 43, 53).

20 Claims, 4 Drawing Sheets

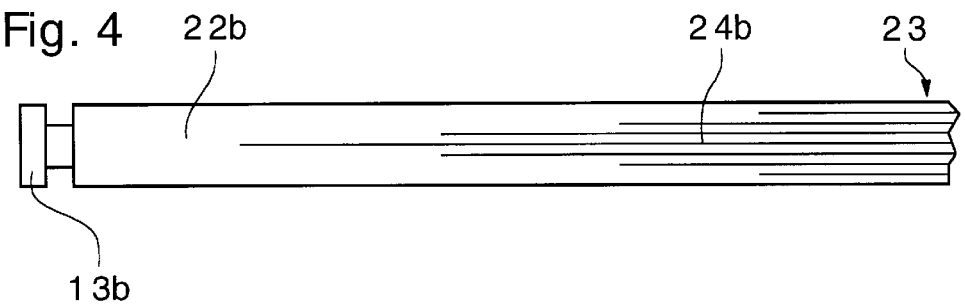
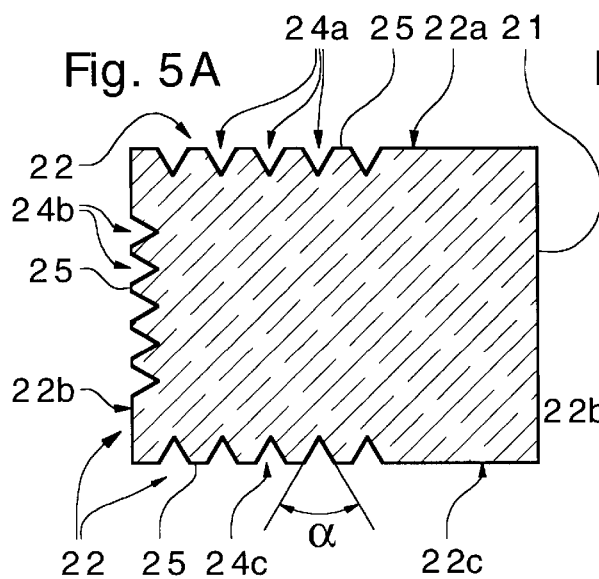
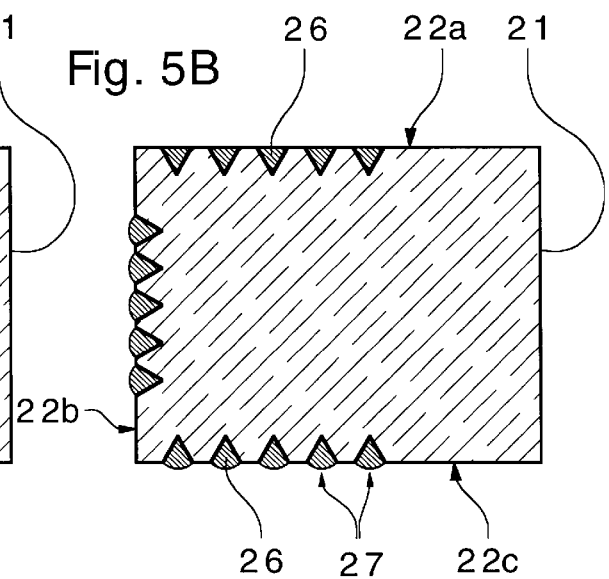
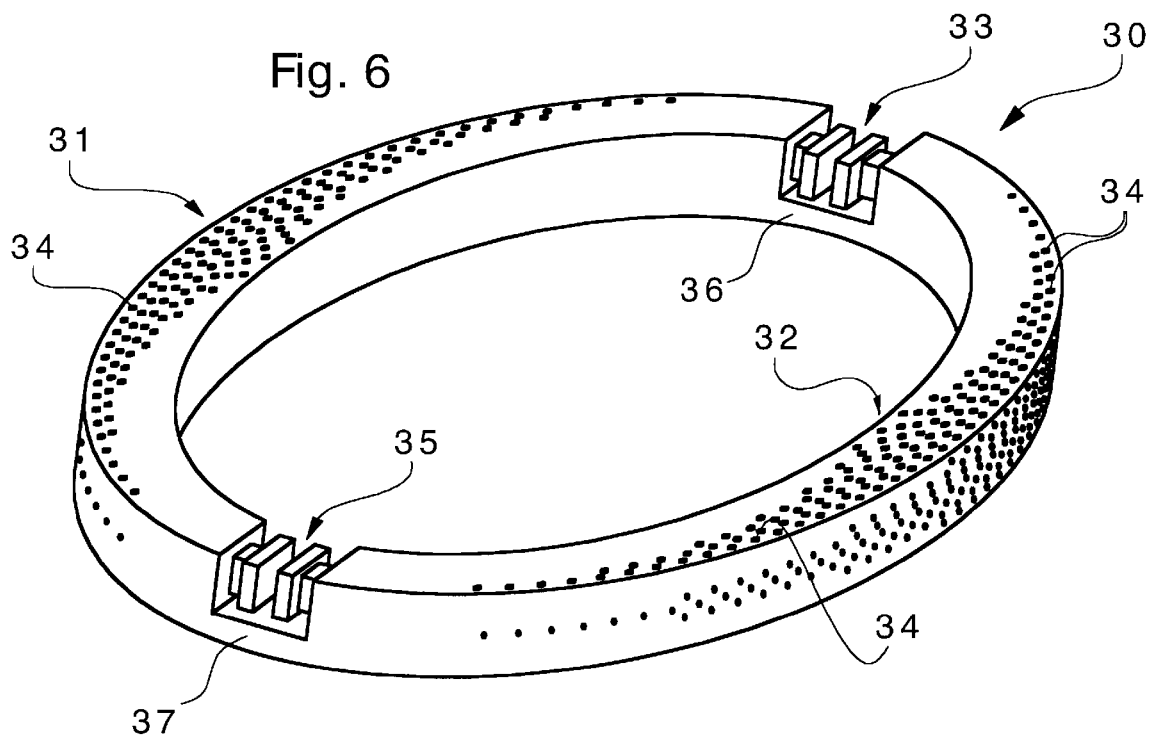

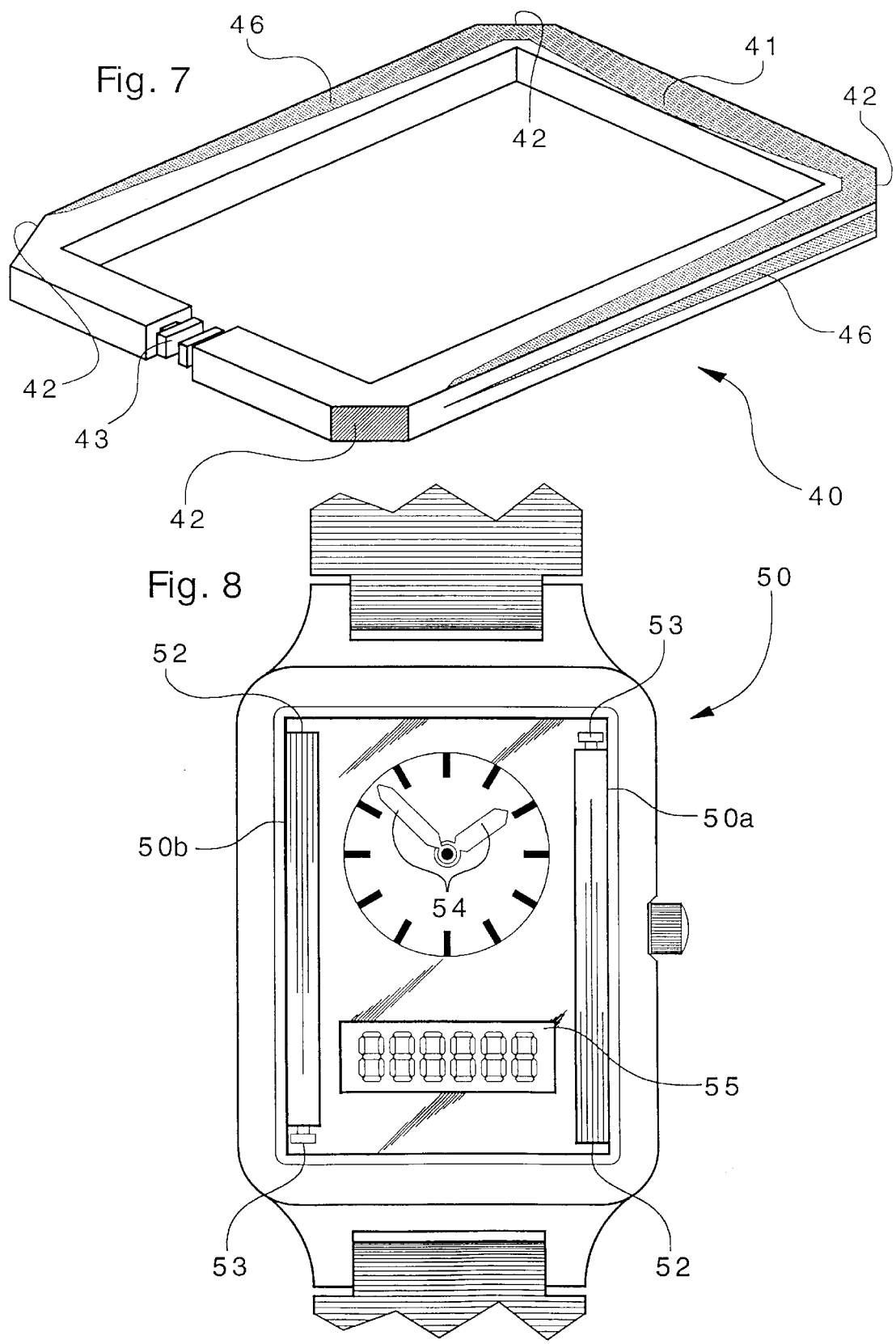

UNIFORM ILLUMINATION DEVICE FOR THE DIAL OF A DISPLAY DEVICE

BACKGROUND OF THE INVENTION

The present invention concerns a uniform illumination device for the dial of a display device as a result of the particular configuration of a guide for the light emitted by at least one light source, the guide and the light source being situated at the periphery of the dial in the space substantially between the latter and a sealing crystal.

Display devices in which a dial and in particular the dial of a timepiece is illuminated by means of at least one light source, formed of a miniature electric light bulb or a diode, associated with a light guide made of translucent material in the shape of a loop, arranged between the crystal and the dial are already known. Such a device corresponds for example to that disclosed in Swiss Patent No 549 237. During use it has however been noted that the zone of the dial situated in the proximity of the light source was naturally lighter than the diametrically opposite zone. In order to overcome this drawback, U.S. Pat. No. 4,908,739 proposes to distribute at least two light sources at equal distance within an annular guide. Such a device increases the illumination of the dial locally, but does not assist in making it more uniform. By increasing the number of light sources, it would be possible to obtain more uniform illumination, but at the cost of an increase in the consumption of energy, which would constitute a critical factor for the life span of the batteries in the case of application to a timepiece.

Various other arrangements have been proposed for orienting the light coming from the guide more efficiently towards the dial. By way of example, the device of Swiss Patent No 677 306 may be cited, in which a ring forming a diffuser has a cross-section designed so that it has a polished face inclined towards the dial, the other faces being uniformly coated with a matt paint. In Swiss Patent No 336 763 a greater concentration of the light rays towards the dial is obtained by increasing the reflection of the light rays onto the crystal, whose face oriented towards the dial is coated with a thin reflective metallic layer.

As a result of these devices of the prior art, a more intense illumination of the dial is achieved, but uniform illumination is not always obtained, which is unsatisfactory from the aesthetic point of view, and as regards proper legibility of the information inscribed on the dial, such as hour-symbols in the case of an analog display timepiece.

SUMMARY OF THE INVENTION

An object of the present invention is to overcome the drawbacks of this prior art by providing a particular arrangement of the light guide, allowing great uniformity of illumination of the dial of a display device to be obtained.

The invention therefore concerns an illumination device for the dial of a display device formed by a case sealed by a crystal arranged above the dial and held by a fitting ring, said device including at least one light source arranged in at least one housing arranged in a light guide positioned at the periphery of the dial, said guide having a polished internal surface oriented towards the dial and an external surface held in a space delimited by the dial, the crystal and the inner wall of the fitting ring, characterised in that all or part of said external surface of the guide is arranged to allow a progressive increase along the guide of the quantity of light diffused by said external wall gradually as one moves away from one of the light sources.

In the foregoing, "fitting ring" should be understood in the wide sense as being any device maintaining the relative position of the crystal with respect to the dial, whatever the respective contour of such two elements. In the case of a timepiece, the "fitting ring" will be for example the middle part or a bezel.

It is known that the luminous energy in a light guide decreases gradually as one moves away from a light source not only because of the absorption by the material of the guide, but also because of the light taken out of the guide by diffusion phenomena.

The new design of light guide according to the invention essentially allows the illumination of a dial to be optimised by carrying out a rectification of the incident light rays on the external surface of the guide. This rectification is made possible by diffusion according to a lobe oriented towards the inner surface of the guide. This diffusion is stronger the further one moves away from the light source, compensating in some manner, the decrease in luminous energy along the guide.

In the case of a device including for example only one light source, the diffusion will thus be maximum in the portion of the guide diametrically opposite to the light source.

Different treatments of the external surface are possible in order to vary the useful diffusion surface, on which the gradient of the quantity of diffused light depends. It will be recalled first of all that the optimum diffusion is obtained with a Lambertian reflector, the tyical model of which is the surface of a magnesium oxide block, with which all the incident light is diffused according to a spherical lobe.

A first embodiment thus consists of applying onto the smooth external surface of the guide a layer of a diffusing material of the Lambertian type, progressively increasing the coated surface as one moves away from a light source. In the case of a guide of rectangular cross-section, this layer will be applied in priority onto the small side opposite the polished inner surface. It may also be applied in the same manner onto the two other surfaces held between the crystal and the dial, or onto the three faces forming the external surface.

According to a second embodiment, structuration of the external surface is effected increasing the density of structuration progressively as one moves away from a light source. According to a first alternative, this structuration consists in arranging grooves in the external surface, oriented on the guide parallel to the line of curvature of said guide, the number of such grooves increasing progressively as one moves away from a light source. According to a preferred embodiment, the grooves have a V-shaped cross-section.

According to a second alternative, this structuration consists in arranging small hollows or recesses made in the external surface of the guide, the number of such hollows per surface unit increasing progressively as one moves away from a light source. According to a preferred embodiment, these hollows have a conical shape. The structuration with grooves or hollows is effected for example by laser machining or simply by moulding.

According to a third embodiment the variation in the quantity of diffused light along the guide via the external surface is obtained by effecting both structuration of the external surface with grooves or hollows, as indicated in the second embodiment, and by depositing in the hollow portions the diffusing material used in the first embodiment.

Whatever the embodiment allowing a variation in the quantity of diffused light to be obtained along the guide, it is also possible to arrange a mirror surface behind the entire external surface of the guide so as to reflect the rays which would not undergo total reflection in the untreated portions of the guide. According to the preferred embodiment, the mirror surface is not applied against the guide itself, but separated from the latter by an air gap.

The material forming the guide is selected to have a high reflective index, while being inexpensive and easily able to be machined. A suitable material is for example polymethylemetacrylate (PMMA) or polycarbonate (P.C.).

The shape of the cross-section of the guide is not determining for obtaining uniform illumination. However, according to a preferred embodiment, corresponding in particular to the easiest and most economical industrial implementation, the cross-section of the guide is rectangular, a small side perpendicular to the surface of the dial corresponding to the polished inner surface, while the other three sides correspond to the external surface.

The shape of the light guide is of course adapted to the shape of the dial whose contour it follows. The same is true for the number and location of the light sources. When a single light source is used, the light guide will preferably not have any angular portions and will thus have the shape of a circular or oval loop. When the guide has angular portions, for example when it has a rectangular shape, it is desirable to arranged either a light source or a mirror allowing the light rays to be rectified, at each angular portions.

Although the uniform illumination device for a dial can be applied to any type of display, the description which follows will be made, for the purpose of convenience, with reference to a timepiece and more specifically a wristwatch. Likewise, this device can be applied to any display means, but the detailed description will essentially be made with reference to an analog display, i.e. a display in which at least one hand moves opposite markings or symbols carried by a dial.

This in no way excludes the illumination device according to the invention being adapted to a dial including, in whole or in part, a digital device for the display of time-related or other information. Likewise, the illumination device according to the invention may be incorporated in other arrangements changing the visual appearance of the dial. In a rectangular dial configuration, uniform illumination may also be obtained simply by means of a guide formed of two distinct bars each provided with a light source at one end and a mirror at the other end, being arranged close to two parallel edges of the dial.

Other features and advantages of the present invention will appear in the following description of various embodiments, with reference to the annexed drawings, in which:

BRIEF DESCRIPTION OF THE DRAWINGS

FIG. 4 is the developed view of the small external side of the guide of FIG. 3 between the light source and the diametrically opposite point;

FIG. 5A is a cross-section of the light guide along the line V—V of FIG. 3;

FIG. 5B is another representation of the cross-section along the line V—V of FIG. 3;

FIG. 6 is a perspective view of the light guide of a second embodiment of an illumination device according to the invention;

FIG. 7 is a perspective view of the light guide of a third embodiment more particularly adapted to the illumination of a rectangular dial; and FIG. 8 is a top view of a fourth embodiment also adapted to the illumination of a rectangular dial.

DESCRIPTION OF PREFERRED EMBODIMENTS

Figure 1:
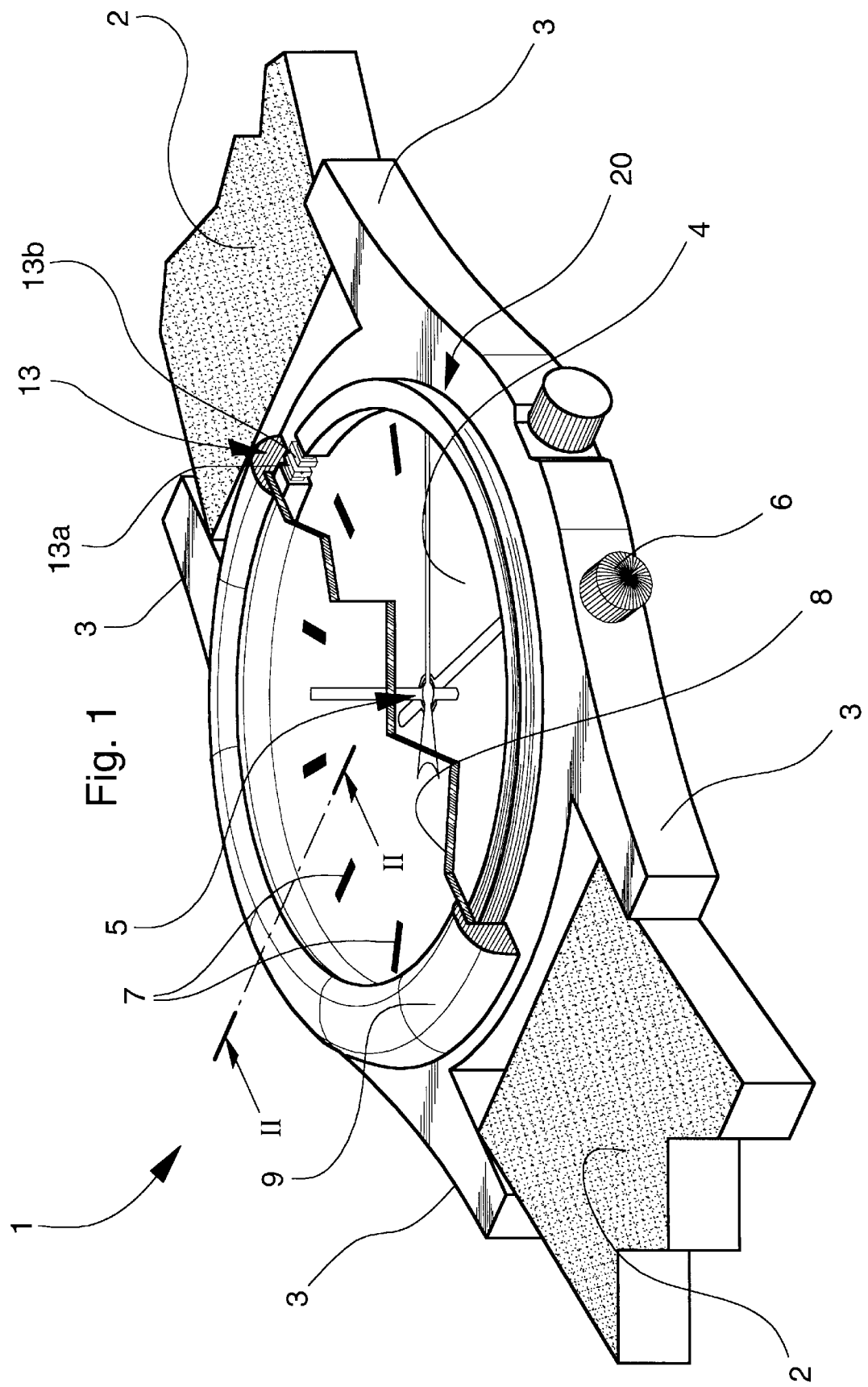
FIG. 1 is a perspective view of a wristwatch partially showing a first embodiment of an illumination device according to the invention.
Figure 2:
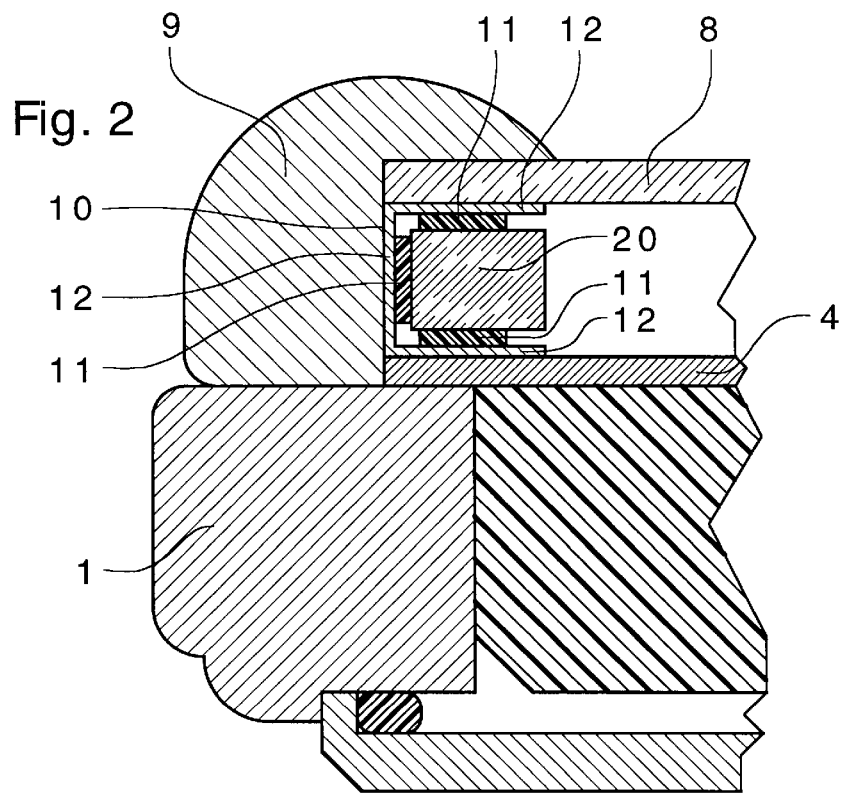
FIG. 2 is an enlarged partial cross-section along the line II—II of FIG. 1.

Referring more particularly to FIGS. 1 and 2, it is seen that the wristwatch shown is of a common type with a round-shaped case 1, containing a clockwork movement, and a wristlet 2 each strand of which is fixed to the case between horns 3. The time display is effected on a dial 4 by means of hands 5 which move opposite hour-symbols 7. The display means are protected by a crystal 8 held in place by a bezel 9 attached to case 1 and the periphery of which extends onto the dial, as is seen more clearly in the cross-section of FIG. 2. The part of FIG. 1 in which the crystal and the bezel have been partially torn away shows the light guide 20. Light guide 20, of annular shape with a rectangular cross-section, is housed in the space delimited by inner wall 10 of bezel 9 and the faces opposite dial 4 and crystal 8. As appears more clearly in FIG. 2, guide 20 is held in its housing by spacers 11 arranged spaced from each other so as to have a small air gap between the external surface of the guide and the facing walls, against which are arranged mirror surfaces 12 allowing the rays which would escape from the guide to be reflected. These mirror surfaces are for example made of silver coated PET films.

At the 12 o'clock position, the guide has an interruption forming a housing in which a light source 13 is arranged. In the embodiment shown, this light source is formed by two LED's 13a, 13b, arranged back to back and bonded onto the cross-sections of the guide, and allowing the light to be injected into the guide in opposite directions. Al-Ga-As diodes emitting 639 nm with a supply voltage of 1.65 V will for example be used. The electric supply source may be the same as that of the clockwork movement and the supply voltage may be applied upon demand by actuating a push-button 6.

Referring now more particularly to FIGS. 3, 4, 5A and 5B, it is seen that annular guide 20 of rectangular cross-section, includes a polished inner surface 21 formed by a small side perpendicular to dial 4 and oriented towards the centre of the latter, and an external surface 22 formed by the three other sides 22a, 22b, 22c. In the example shown, the three sides forming the external surface of the guide are arranged to obtain an increase in the active surface to diffuse the light progressively as one moves away from light source 13, i.e. to have maximum diffusion in a zone 23 of the guide diametrically opposite source 13.

This arrangement consists of a progressive structuration of the entire external surface via grooves 24a, 24b, 24c oriented along the line of curvature of the guide, on faces 22a, 22b, 22c forming external surface 22.

Figure 3:
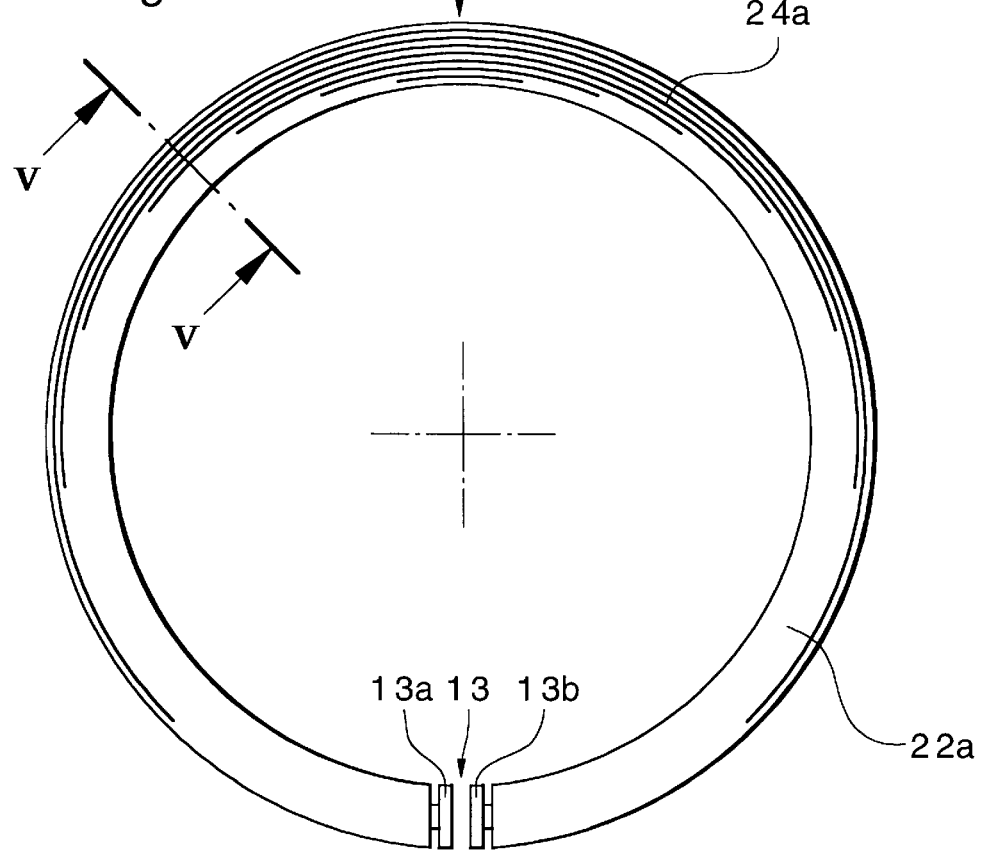
FIG. 3 is an enlarged top view of the light guide of the wristwatch shown in FIG. 1.

FIG. 3 shows the structuration of upper face 22a of the guide facing crystal 8. It is to be noted that the number of grooves 24a, counted at right angles to the guide, increases when one moves away from light source 13, and when one moves away from the centre of dial 4, and that their density is thus maximum in zone 23 from which they have a symmetrical arrangement on the guide. The structuration effected on face 22c oriented towards the dial has grooves 24c having the same configuration as those of face 22a.

FIG. 4 shows a developed half-view of face 22b, i.e. of the portion going from light source 13 to zone 23. As is seen, the number of grooves 24b, counted at right angles to the guide, increases when one moves away from the light source, the grooves being in this case distributed symmetrically on either side of the median line of face 22b.

The enlarged cross-section of FIG. 5A, made at a point of the guide at some distance from greatest density zone 23, gives an embodiment example of such V-shaped grooves of angle α, separated by flat surfaces 25. According to the refractive index of the material forming light guide 20 and the radius of curvature of the surface at a given point, this angle will be able to vary between 30 and 45°. By way of example, for a circular guide of PMMA of refractive index n=1.49, angle α will preferably have the value of 40°. Likewise the maximum number of grooves and their densification along the curvature of the guide may vary as a function of the dimensions of the guide. Purely by way of illustrative example, faces 22a and 22c of a guide having a width of 2 mm includes 7 grooves in zone 23, the outermost groove having a length substantially equal to ⅔ of the circumference of the guide. These grooves may be formed in the guide by any appropriate means such as $CO_2$ laser machining, or moulding during manufacturing of the guide itself.

FIG. 5B shows the same guide as that of FIG. 5A, in which grooves 24a, 24b, 24c have been filled with a diffusing material 26. For face 22a, an embodiment in which the diffusing material lies flush with the surface has been shown and for face 22c another embodiment in which the diffusing material forms bulge portions 27 above the grooves has been shown. These bulge portions 27 may be sufficient to maintain a small air gap between external surface 22 of the guide and the surfaces facing the crystal, the dial and the middle part, thereby making the use of spacers 11 superfluous.

Diffusing material 26 which has proved to be most appropriate is constituted by a titanium oxide paint containing an equal part of barium sulphate and a small quantity of powdered PTFE, for example in the proportions 42/42/16.

FIG. 6 shows another embodiment of a guide 30 which differs from that which has just been described essentially in that its general shape is oval and in that it includes two light sources 33, 35 and structuration of the external surface formed by hollows or recesses 34. Light sources 33, 35 are diametrically opposite along the major axis and each is housed in a notch formed by the cross-sections of the guide and a connecting base 36, 37. These notches, or equally the light sources, thus delimit in guide 30 two symmetrical sectors whose zones 31, 32 having the greatest hollow density, and thus the greatest diffusion power, are substantially situated on the minor axis.

These hollows 34 will have for example a conical shape with an angle able to vary, as already indicated for the grooves. For the distribution of these hollows on each of the faces forming the external surface, reference will also be made to the description given for the grooves.

Referring now to FIG. 7, a top view of a light guide 40 configured to follow the whole contour of a rectangular dial is shown. This guide includes a single light source 43 situated in the middle of a small side. Each angle of the external surface oriented towards the fitting ring is treated to have a mirror portion 42 allowing the light rays to be rectified. In this example, the variation in the diffusion power of the external surface is obtained by application of a diffusing layer 46 having the previously indicated composition, and having maximum covering in zone 41, in the middle of the small side opposite that provided with the light source. According to an alternative, the single light source may be replaced by two light sources arranged in adjacent or opposite angles, the two other angles being provided with mirrors, and the diffusing layer being adapted to the arrangement of the light sources.

FIG. 8 shows in top view, another embodiment of a wristwatch with a rectangular dial in which the illumination device 50 according to the invention consists of two bars 50a, 50b having the same shape and arranged head-to-tail. Each rectilinear bar includes at one end a light source 53 and at the other end a mirror 52. The structuration allowing the diffusion to be varied along each guide, represented here by grooves is arranged so that the fronts of equal illumination substantially cover each other. As is also seen the dial includes both an analog display 54 and a digital display 55. It is also perfectly possible, and compatible with the illumination device according to the invention, to change the base of the part of the dial reserved for the analog display by any method known to the man skilled in the art, for example by arranging at this location a cell which state is able to be changed by electrophoretic method.

According to an alternative which is not shown, it may be advantageous, in particular in the case of a substantially square shaped dial, to arrange the two bars parallel to the 3 o'clock–6 o'clock axis by placing the light sources of the bars not head-to-tail but on a same side.

The examples which have just been described are capable of numerous variations and adaptations within the reach of the man skilled in the art without departing from the scope of the invention.

What is claimed is:

1. An illumination device for the dial of a display device formed by a case sealed by a crystal arranged above the dial and held by a fitting ring, said device including at least one light source arranged in at least one recess arranged in at least one light guide positioned at the periphery of the dial, said guide having a polished internal surface oriented towards the dial and an external surface held in a space delimited by the dial, the crystal and the inner wall of the fitting ring, wherein at least part of said external surface of the guide is arranged to allow a progressive increase along the guide of the quantity of light diffused by said external wall gradually as one moves away from one of the light sources.

2. An illumination device according to claim 1, wherein the external surface has a layer made of a diffusing material of the Lambertian type which progressively covers said external surface gradually as one moves away from a light source.

3. An illumination device according to claim 2, wherein the diffusing material layer is a titanium oxide paint comprising barium sulphate and powdered polytetrafluroethylene.

4. An illumination device according to claim 1, wherein the external surface is structurated the density of the structuration increases gradually as one moves away from a light source.

5. An illumination device according to claim 4, wherein the structuration is formed by grooves oriented on the guide parallel to the line of curvature of said guide and the number of which increases gradually as one moves away from a light source.

6. An illumination device according to claim 5, wherein the grooves have a V-shaped cross-section.

7. An illumination device according to claim 4, wherein the structuration is formed by hollows the number of which per surface unit increases gradually as one moves away from a light source.

8. An illumination device according to claim 4, wherein the external surface has a layer made of a diffusing material of the Lambertian type which progressively covers said external surface gradually as one moves away from a light source, wherein the external surface of the guide includes both a structuration and a diffusing material deposited in a groove or hollow parts.

9. An illumination device according to claim 1, wherein the arrangement of the external surface of the guide is such that the diffusion power also increases gradually as one moves away from the internal surface.

10. An illumination device according to claim 1, wherein the light guide has a rectangular cross-section, one small side of which, perpendicular to the surface of the dial, forms the internal polished surface, and the other three sides of which form the external surface.

11. An illumination device according to claim 10, wherein the arrangement allowing variation in the diffusion to be obtained along the guide is effected over the entire external surface.

12. An illumination device according to claim 1, wherein it further includes a mirror surface of the guide arranged facing the external surface, but not applied against the latter.

13. An illumination device according to claim 1, wherein the light guide is adapted to the shape of a circular or oval dial.

14. An illumination device according to claim 1, wherein the light guide is adapted to the shape of a square or rectangular dial.

15. An illumination device according to claim 14, wherein the light guide follows the entire contour of the dial and further includes at least two mirrors which are applied to the portion of external surface facing the fitting ring and which are arranged in the angles.

16. An illumination device according to claim 14, wherein the light guide consists of two distinct bars which are each provided with a light source at one end, with a mirror at the other end and which are arranged close to two parallel edges of the dial.

17. An illumination device according to claim 1, wherein the housing of one light source is formed between two cross-sections of the guide.

18. An illumination device according to claim 1, wherein the housing of one light source is formed between two cross-sections of the guide connected to each other by a strip of material forming the guide.

19. An illumination device according to claim 1, wherein each light source consists of two diodes arranged back-to-back.

20. A timepiece including an illumination device according to claim 1.

* * * * *